UNITED STATES PATENT OFFICE.

GEORGE J. BUECHERT, OF SAN FRANCISCO, CALIFORNIA, ASSIGNOR TO ERIC A. STARKE AND ROBERT J. LAYNG, OF SAME PLACE.

EXPLOSIVE COMPOUND.

SPECIFICATION forming part of Letters Patent No. 524,776, dated August 21, 1894.

Application filed July 20, 1893. Serial No. 481,048. (No specimens.)

*To all whom it may concern:*

Be it known that I, GEORGE J. BUECHERT, a citizen of the United States, residing in the city and county of San Francisco, State of California, have invented an Improvement in Explosive Compounds; and I hereby declare the following to be a full, clear, and exact description of the same.

My invention relates to an improved explosive compound.

It consists in the combination of sulphate or chloride of ammonia and the nitrate of an alkali, such as nitrate of soda, with wood pulp and nitro-glycerine.

The object of my invention is to form a coating for the particles of sulphate of ammonia to prevent their forming such a direct contact with the nitrate of soda or other alkali as will allow the chemical change taking place in the two substances at ordinary temperature.

In the preparation of my compound I first take the sulphate of ammonia reduced to the proper condition for the formation of powder, and I mix with it a small proportion of resin oil or any other well known resinous, fatty, or other protective coating substance.

In one hundred pounds by weight I take eighty-five parts sulphate of ammonia, and about fifteen parts of the coating substance which is intimately mixed with the sulphate of ammonia until it forms a coating for the particles, and thus prevents their forming such contact with the nitrate of soda or other alkali, as will allow of the chemical change taking place in the two substances, which it does by preventing any direct contact between the particles of the two substances. When this coating has been effected, I take by weight thirty parts of sulphate of ammonia, forty parts nitrate of soda, and mix with them five parts of wood pulp, and then add twenty-five parts of nitro-glycerine. This forms a very effective high explosive, and by reason of the coating I am enabled to employ the two substances, sulphate or chloride of ammonia with the nitrate of an alkali, and to maintain the powder thus made in an unchanged condition.

Having thus described my invention, what I claim as new, and desire to secure by Letters Patent, is—

The compound consisting of a salt of ammonia as set forth and nitrate of soda with a coating of protective substance whereby actual contact between the particles of the two substances is prevented, and wood-pulp and nitro-glycerine, substantially as herein described.

In witness whereof I have hereunto set my hand.

GEORGE J. BUECHERT.

Witnesses:
GEO. H. STRONG,
S. H. NOURSE.